July 16, 1935. W. G. CALKINS 2,008,002
DEVICE FOR MOUNTING VALVE SEAT INSERTS
Filed Sept. 28, 1932
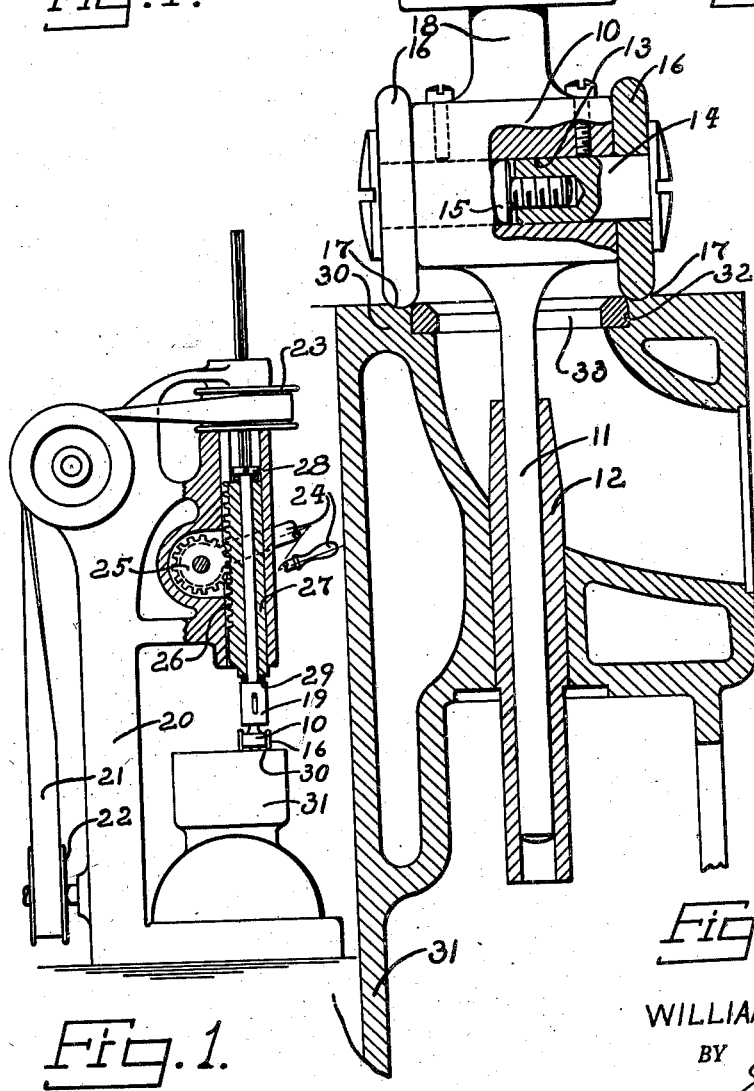
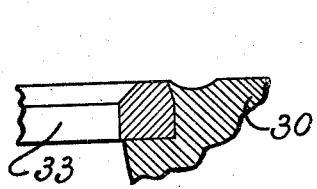
Fig. 4.
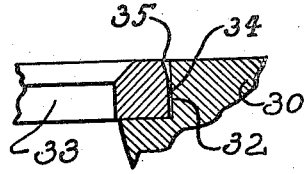
Fig. 3.
Fig. 2.
Fig. 1.
INVENTOR.
WILLIAM G. CALKINS.
BY
ATTORNEYS.

Patented July 16, 1935

2,008,002

UNITED STATES PATENT OFFICE 2,008,002

DEVICE FOR MOUNTING VALVE SEAT INSERTS

William G. Calkins, Detroit, Mich., assignor to Chrysler Corporation, Detroit, Mich., a corporation of Delaware Application September 28, 1932, Serial No. 635,233

2 Claims. (Cl. 80—1)

This invention relates to an improved method and means for mounting valve seats in the structure of the valve chamber of an engine and it has particular relation to the mounting of hardened heat resisting valve inserts.

The main objects of the invention are to provide a method for securing hardened heat resisting valve insert seats in a wall of a valve chamber in concentric relation to the valve stem guide thereof; to provide a method of this character which does not require holding of the dimensions of the valve insert seat and the recess within which it is received to close limits and which obviates the necessity of an initial press fit between the peripheries of the valve seat inserts and its recess during insertion of the valve seat; to provide a method of this character which eliminates the necessity of inserting the valve seat inserts under pressure of large magnitude; and to provide a method of this kind by which the metal of the structure in the vicinity of the valve seat is gradually worked into overlapping relation with one surface of the valve seat insert and into binding engagement with the outer peripheral surface thereof so as to firmly secure the inserts in place without welding or brazing the metals or treating them in any manner which tends to change their structural properties.

Other objects of the invention are to provide an improved device for working the metal surrounding a valve seat insert receiving recess into overlapping relation with respect to one surface of a valve seat insert and into binding engagement with another surface thereof; to provide a tool of this kind which is adapted to be accurately centered with respect to the insert receiving recess by a valve stem guide of an engine; to provide swaging elements which, during operation, have rolling contact with the metal of the structure surrounding the insert receiving recess; to provide rolling contact swaging elements by which a sufficient unit pressure upon the metal surrounding the insert receiving recess is obtainable from a comparatively small force of application to work such metal into a desired relation to the insert; and to provide a tool of this kind which is operable under force magnitudes that are far below the maximum force the structure operated upon is capable of withstanding.

An illustrative embodiment of the invention is shown in the accompanying drawing, in which:

Fig. 1 is a side elevational view, partly in section, of a machine including a valve seat insert device embodying my invention.

Fig. 2 is a fragmentary side elevational view, partly in section, of the device shown in Fig. 1 and illustrating the manner in which the latter is employed in mounting a valve insert seat in the structure of an engine.

Fig. 3 is a fragmentary transverse sectional view of the part of the engine structure in which the valve seat insert is mounted illustrating the manner in which it is received during installation.

Fig. 4 is a fragmentary view similar to Fig. 3 but showing the valve seat insert firmly secured in place.

In the form shown, my improved valve seat insert mounting device includes a body portion 10 having a piloting member 11 extending from one side thereof which is receivable in a conventional valve stem guide 12 of a valve chamber of an engine. Formed in the body portion 10 is a transverse bore 13 which extends substantially perpendicular to the axis of the piloting member 11 and in which are mounted trunnion elements 14 and 15. The trunnion elements 14 and 15 are provided on their outer extermity with screw slotted heads and their adjacent ends are respectively provided with internal and external screw threads, by which the trunnions are fixed together. Journaled on the outer end portions of the trunnion elements 14 and 15 are swaging members or rollers 16 which have crowned outer peripheral portions 17 that are adapted to work metal inwardly toward the axis of the piloting member 11 during the operation of the device hereinafter set forth.

My improved valve seat insert mounting device may be operated by any suitable driving mechanism which is adapted to impart rotary movement as well as to urge the device axially of the piloting member, such as a conventional drill press of the type illustrated in Fig. 1. The body portion 10 of the valve seat insert mounting device is provided with a shaft 18 which is substantially co-axial with the piloting member 11 and which protrudes from the side of the body portion opposite to the side thereof from which the piloting member extends. The shaft 18 is preferably detachably connected in any suitable manner to the spindle 19 of the drill press which is rotatably and shiftably mounted on the bed portion 20 of the press. The drill press is provided with suitable rotative driving mechanism such as the belt 21 and pulleys 22 and 23 by means of which the spindle 19 and the valve seat insert mounting device are rotated. The spindle 19 may be manually raised and lowered by manipulation of the lever 24 which operates a pinion 25 that is meshed with rack teeth 26 on a sleeve 27 in which the spindle is journaled. The sleeve 27 is confined between collars 28 and 29 which are fixed on the spindle and which impart the raising and lowering movement thereto.

In mounting valve seat inserts in accordance with my improved method the upper wall 30 of the valve chamber which, in the illustration shown, is at the upper extremity of the cylinder block 31, is provided with a circular recess 32 which is substantially concentric with the axis of the valve stem guide 12. A ring-shaped valve seat insert 33, preferably comprising a suitable hardened alloy steel that is capable of retaining its physical properties at elevated temperatures such as tool steels commercially known as high speed steel is then placed in the recess 32. The outer diameter of the valve seat insert is preferably small enough so that the insert will freely slide into the recess without requiring pressures of large magnitude. If desired, a slight clearance 34, illustrated in Fig. 3, may be provided between the outer periphery of the insert and the peripheral wall of the recess. The outer edge portion of the insert 33 is beveled as illustrated at 35.

After the valve seat insert is thus placed in position the piloting member 11 is inserted in the valve stem guide and the spindle 19 of the press is lowered until the crown shaped peripheries of the rollers 16 seat upon the upper face of the valve chamber wall 30. The insert mounting device is then rotated by the spindle while the latter is urged downwardly by the manipulation of the lever 24. This operation causes the swaging members 16 to roll upon the upper face of the valve chamber wall 30 and to work the metal of the zone surrounding the recess 32 inwardly toward the axis of the piloting member 11. The metal is crowded over the beveled member 35 of the valve seat insert and forced into binding engagement with its outer periphery, thereby firmly securing the insert in place.

Although but one specific embodiment of the invention is herein shown and described, it is understood that various changes may be made without departing from the spirit of my invention and it is not intended to limit its scope other than by the terms of the appended claims.

What I claim is:

1. A device for mounting a metal insert in a recess of a metal structure including a body portion having a central bore, trunnions mounted in said bore and having their internally disposed ends in threaded engagement, means for rotating said body portion and urging the same axially of its axis of rotation against said metal structure, means for holding said body portion against lateral movement relative to said structure, and a working element mounted on each of said trunnions so constructed and arranged as to displace the metal of said structure surrounding the recess thereof laterally toward the axis of said device by axial pressure thereof upon said structure.

2. A device for mounting a metal insert in a recess of a metal structure including a body portion having a central bore, a trunnion having a threaded end portion and an enlarged head portion mounted in said bore, means engaging the threaded end portion of said trunnion for fixing it against axial movement relative to said bore, means for rotating said body portion and urging the same axially of its axis of rotation against said metal structure, means for holding said body portion against lateral movement relative to said structure, and a working element mounted on said trunnion so constructed and arranged as to displace the metal of said structure surrounding the recess thereof laterally toward the axis of said device by axial pressure thereof upon said structure.

WILLIAM G. CALKINS.